United States Patent [19]
Forrest

[11] Patent Number: 5,616,261
[45] Date of Patent: Apr. 1, 1997

[54] LASER WELDING SYSTEM

[75] Inventor: Mariana G. Forrest, Troy, Mich.

[73] Assignee: Chrysler Corporation, Auburn Hills, Mich.

[21] Appl. No.: 474,565

[22] Filed: Jun. 7, 1995

[51] Int. Cl.⁶ .................................................. B23K 26/00
[52] U.S. Cl. .......................... 219/121.63; 219/121.77
[58] Field of Search ................... 219/121.63, 121.64, 219/121.73, 121.77, 121.78, 121.8

[56] References Cited

U.S. PATENT DOCUMENTS

| | | | |
|---|---|---|---|
| 4,185,185 | 1/1980 | Adlam . | |
| 4,654,505 | 3/1987 | Sciaky et al. | 219/121.63 |
| 4,843,209 | 6/1989 | Milligan | 219/121.63 |
| 4,847,467 | 7/1989 | Ausilio | 219/121.63 |
| 4,945,489 | 7/1990 | Vahab | 219/121.63 |
| 5,049,720 | 9/1991 | Fang et al. | 219/121.63 |
| 5,053,601 | 10/1991 | Landtwing et al. | 219/121.63 |
| 5,059,758 | 10/1991 | Andersson | 219/121.63 |
| 5,064,991 | 11/1991 | Alborante | 219/121.63 |

FOREIGN PATENT DOCUMENTS

| | | | |
|---|---|---|---|
| 57-64487 | 4/1982 | Japan | 219/121.78 |
| 1-197092 | 8/1989 | Japan | 219/121.63 |
| 2-235591 | 9/1990 | Japan | 219/121.63 |
| 6-234089 | 8/1994 | Japan | 219/121.64 |

*Primary Examiner*—Geoffrey S. Evans
*Attorney, Agent, or Firm*—Thomas G. Pasternak

[57] ABSTRACT

A laser welding system for welding sheets of material, such as automobile body parts, together includes a plurality of clamps. The system includes a fiber optic cable for each clamp having a first end coupled to a laser beam source and a second end coupled to the clamp for transmitting a laser beam from the laser beam source to the clamp. The system further includes a focusing head secured to each clamp and the second end of the cable for focusing the laser beam onto the material to be welded.

30 Claims, 4 Drawing Sheets

LASER WELDING SYSTEM

FIELD OF THE INVENTION

This invention relates to laser welding systems for welding sheets of material together.

BACKGROUND OF THE INVENTION

Laser welding has many well known advantages over conventional resistance welding. For example, laser welding provides low distortion, small heat affected zones (HAZ), improved mechanical/structural performance, increased speed of processing, improved process controllability/consistency and single sided access. However, one great disadvantage of laser welding is the requirement of tight gaps between the parts to be welded which in turn requires precise positioning of the laser beam relative to the parts to be welded.

Typically, laser welding systems utilize welding clamps which clamp and fix the parts to be welded together. Robots are used to perform the welding operation. A laser beam generator or source generates or produces a laser beam. The laser beam is transmitted to a focusing head via a fiber optic cable. The focusing head is installed or mounted on the end of the robot arm. The robot is then programmed to accurately position the focusing head, and thus the laser beam focal point, relative to the parts to be welded. The welding is done sequentially as the robot must move from weld joint to weld joint. With a robotic-based laser welding system, time is wasted during non-welding motion from joint to joint. Also, accuracy and repeatability of positioning the laser beam focal point relative to the surface of the parts to be welded is difficult to accomplish at high speeds with a robot. Part dimensional variations and motion trajectory errors lead to difficulties in obtaining consistent weld quality.

U.S. Pat. No. 4,654,505 issued Mar. 31, 1987 to Sciaky et al. discloses a multi-point laser welding system for vehicle bodies and the like which includes apparatus for positioning the pieces to be welded, apparatus for gripping the pieces to be welded, and apparatus for welding the positioned and gripped pieces at specific points. The '505 patent employs a laser beam delivery system using multiple motor driven optical mirrors controlled by a computer program to focus a laser beam upon a single point on the parts to be welded. The '505 patent does not disclose moving the laser beam across the parts to be welded to provide a linear or curved stitch, as opposed to a single point spot weld. Additionally, the '505 patent does not disclose the use of a fiber optic cable for transmitting a laser beam from a laser beam source to a focusing head secured to a clamping fixture. Instead, the laser welding system disclosed in the '505 patent employs multiple mirrors to transmit a laser beam from a laser beam source to the pieces or parts to be welded.

The laser welding system disclosed in the '505 patent also does not disclose confining the laser beam within a clamp fixture as the laser beam is used to perform the welding. Instead, the laser beam travels outside of or externally from the fixture used to clamp the pieces to be welded together. Confining the laser beam so that the laser beam is directly transferred from a focusing head to the parts to be welded is critical since exposed laser beams may create hazardous conditions for those workers near the laser welding system.

SUMMARY OF THE INVENTION

The present invention provides a laser welding system for welding sheets of a material together.

The present invention also provides a computer-controlled laser welding system, including a central computerized time-share installation, which distributes a laser beam, sourced from a single laser generator in a pre-programmed sequence, to remote modular clamps by means of a plurality of fiber optic cables.

The present invention further provides a plurality of modular clamps which cooperate to grip and position sheets of material wherein each clamping unit, upon receiving a distributed laser beam, is adapted to deliver the laser beam to a sheet of material achieving multi-point, linear, and/or two-dimensional weld patterns.

It is another aspect of the present invention to provide plurality of modular clamps adapted for selective tailored mounting and positioning on a common work surface for laser welding sheets of material together.

It is another aspect of the present invention to provide each clamp with a laser beam focusing head which is movable relative to the clamping unit to focus and move a laser beam under computer control over a designated portion of the sheets of material to execute a linear edge joint weld, a linear lap joint stitch, a two-dimensional lap weld, or the like.

It is still another aspect of the present invention to provide each clamp with a slot into which a portion of the laser beam focusing head is placed so as to confine the laser beam for direct transmission to the sheets of material to be welded.

It is still another aspect of the present invention to provide a laser welding system for automobile vehicle body parts and the like, including a computerized time-share system which sequentially switches the laser beam, in a pre-programmed manner, from clamp to clamp to complete the welding.

It is another aspect of the present invention to provide a laser welding system wherein selected ones of the clamps are adapted for producing a linear stitch laser weld for an edge joint or the like while other clamps are adapted for producing a two-dimensional laser weld for a lap joint or the like.

More specifically, the present invention provides a laser welding system for welding sheets of material together comprising at least one clamp having a lower plate and an upper plate movable relative to the lower plate for squeezing together associated sheets of material positioned therebetween and a fiber optic cable for each of the clamps. The fiber optic cable includes a first end coupled to a laser beam source and a second end coupled to the clamp for transmitting a laser beam from its source to the clamp. The laser welding system further includes a focusing head secured to the clamp for coupling the second end of the cable to the clamp and for focusing the laser beam onto the material to be welded.

In one embodiment of the invention, the focusing head is fixedly mounted within a slot, positioned between the upper and lower plates, for single spot welding together the edges of the sheets of material.

In another embodiment of the invention, the focusing head is movably secured within a slot, positioned between the upper and lower plates, for linear stitch welding together the edges of the sheets of material.

in another embodiment of the invention, the focusing head is mounted in a slot in one of the upper or lower plates for welding together opposing surfaces of the sheets of material.

In another embodiment of the invention, the focusing head is movably secured in a slot in one of the upper or lower plates of a clamp for providing a two-dimensional weld on the opposed surfaces of the sheets of material.

These and other features and advantages of the invention will be more fully understood from the following detailed description of the invention taken together with the accompanying drawings.

DETAILED DESCRIPTION OF THE INVENTION

Figure 1:
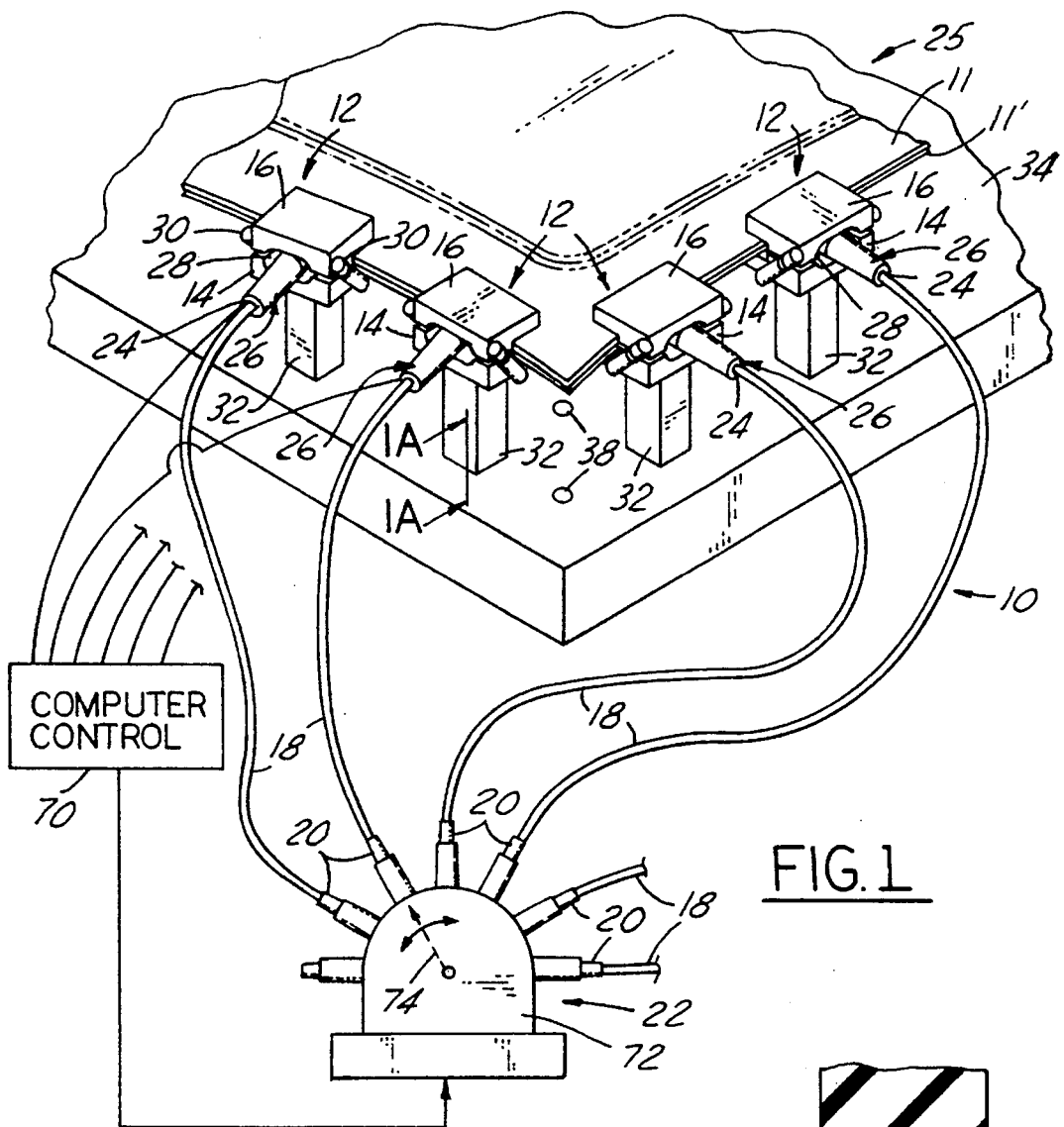
FIG. 1 is a fragmentary perspective view of a laser edge welding system according to the present invention.
Figure 2:
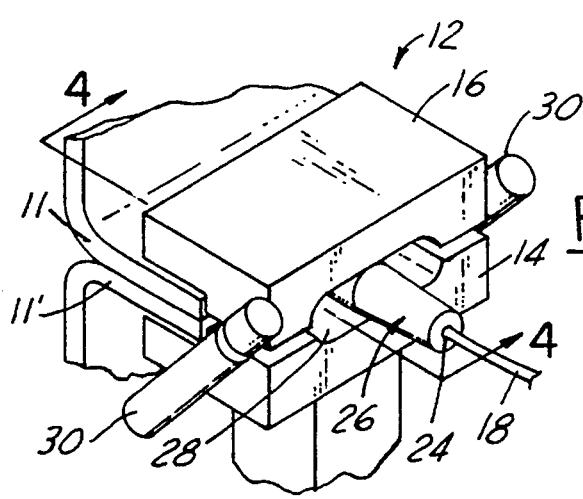
FIG. 2 is a fragmentary perspective view of a clamp used in the laser welding system shown in FIG. 1.
Figure 3:
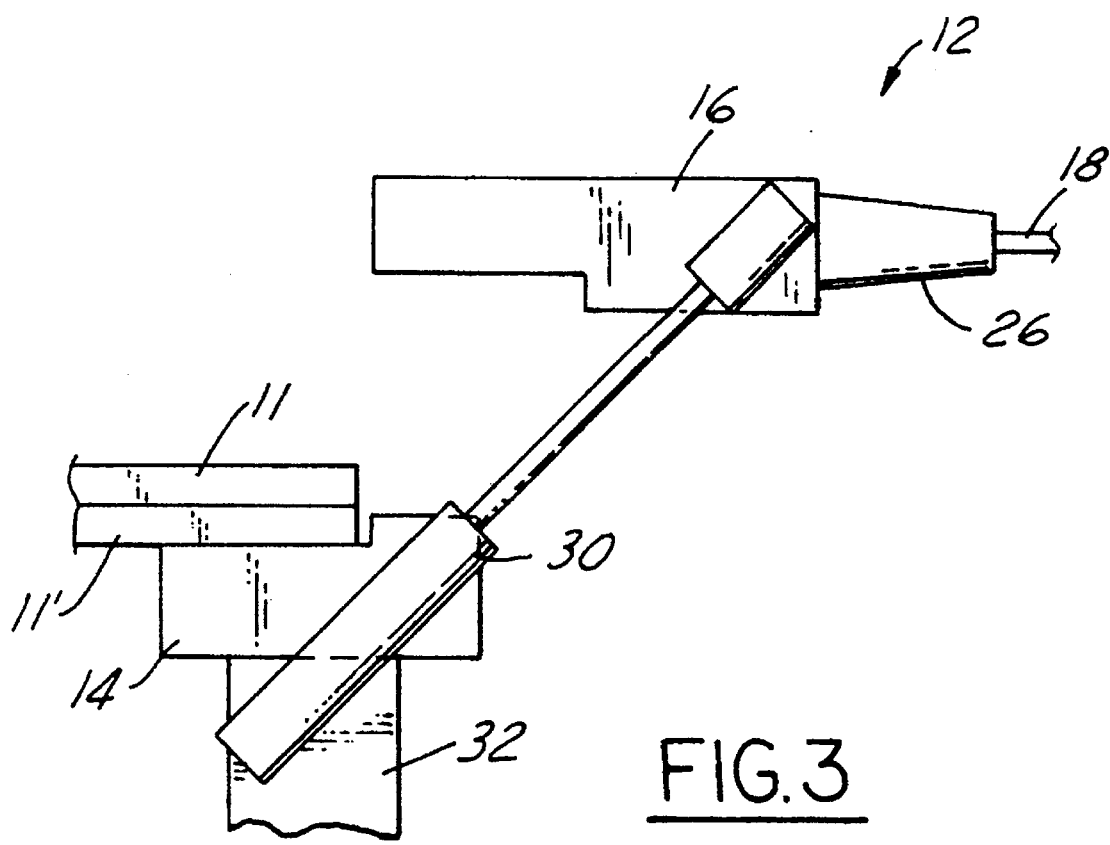
FIG. 3 is a fragmentary side view of the FIG. 2 clamp, showing the clamp plates in their full open position.

Referring now to the drawings, and in particular to FIGS. 1–4, numeral 10 generally indicates a laser welding system for edge welding together a pair of upper 11 and lower 11' sheets of a material, such as automobile sheet metal body portions, by means of a plurality of modular clamps 12. Each clamp 12 includes a lower plate 14 and an upper plate 16, movable relative to lower plate 14, for squeezing together sheets of material 11, 11' positioned therebetween. Each clamp 12 is formed with a horizontally disposed slot 28 extending through clamp 12. At least one clamp power actuator arm 30 is provided for each clamp 12 for moving upper plate 16 relative to lower plate 14 between a first closed position, as seen in FIG. 2, and second opened position, as seen in FIG. 3. Actuator arm 30 may be a conventional hydraulic operated cylinder, an air cylinder, a movable ballnut driven screw or the like.

As seen in FIG. 1, welding system 10 further includes a fiber optic cable 18 for each clamp 12. Fiber optic cable 18 includes a first end fitting 20 adapted to be coupled to a laser beam source 22 and a second end 24 coupled to clamp 12 for transmitting a laser beam from laser beam source 22 to clamp 12 at a remote work station 25.

Figure 4:
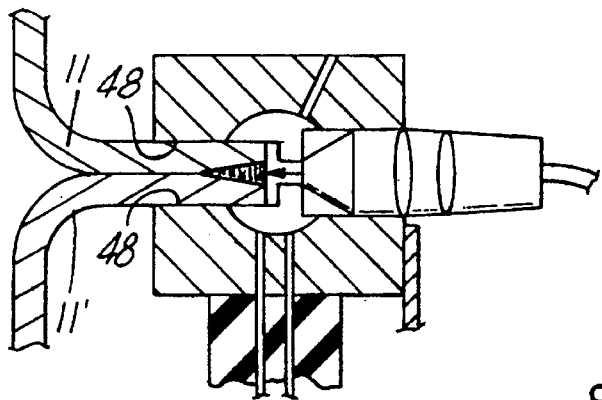
FIG. 4 is a fragmentary cross-sectional view, partly in elevation, of the FIG. 2 clamp shown in its closed position.

Referring to FIG. 4, the welding operation is carried out by a focusing head 26 secured to clamp 12 for coupling second end 24 of fiber optic cable 18 to clamp 12 and for focusing the laser beam onto sheets 11, 11'. Focusing head 26 includes an outer body 40, a recollimating lens 42, a focusing lens 44 and a protective transparent glass cover 46. Recollimating lens 42, focusing lens 44 and glass cover 46 are positioned within outer body 40 in a spaced apart relation. Focusing lens 44 is moveable relative to outer body 40 to vary the distance between recollimating lens 42 and focusing lens 44, thereby varying the position of the laser beam focal point relative to glass cover 46 and the distance of focal point to the edge weld. A motor (not shown) may be provided to drive or move focus lens 44 relative to recollimating lens 42.

Figure 1A:
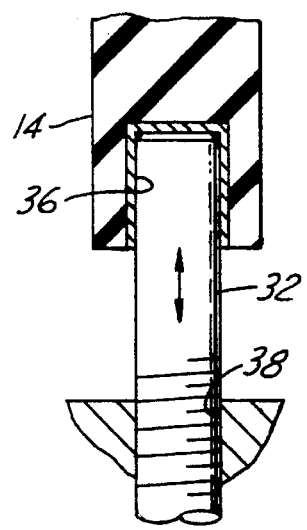
FIG. 1A is a fragmentary cross-sectional view taken about line 1A—1A in FIG. 1.

FIG. 1 illustrates work station 25 including a clamp support member 32, extending downwardly from lower plate 14 of each clamp 12, for elevating each clamp 12 above a work surface 34. Clamp support member 32 is adapted to be removably secured to work surface 34 as seen in FIG. 1A. Clamp support member 32 may be constructed of a resilient material, such as a hard rubber, for flexible clamp adjustment. Referring to FIG. 1A, lower plate 14 includes an elongated axial bore 36 adapted to receive clamp support member 32 in a snug-fit manner. Work surface 34 includes a plurality of apertures 38 for engagement with clamp support member 32 to thereby removably secure clamp support member 32 to work surface 34. Additionally, clamp support member 32 is adapted for axial movement relative to work surface 34 so as to vary the vertical distance between each clamp 12 and work surface 34. Clamp support member 32 may be movable in a vertical direction to raise or lower clamp 12 relative to work surface 34. By virtue of flexible support member 32, clamp 12 is adapted for limited horizontal positioning relative to work surface 34. In this manner, clamp 12 is adapted to accommodate sheet material having minor shape and size tolerance variations.

Still referring to FIGS. 1–4, clamp 12 is shown with slot 28 positioned between lower and upper plates 14, 16 to thereby allow the edges of sheets 11, 11' to be laser welded together. A portion of focusing head 26, shown in FIG. 4 positioned within slot 28, is fixedly mounted to clamp 12. In this manner, the laser beam is adapted to be focused normal to the sheet edges creating a single spot weld edge joint between sheets 11, 11'.

As seen in FIG. 4, lower and upper clamp plates 14, 16 define opposed contoured surfaces 48 adapted to squeeze sheets 11, 11' therebetween. Contoured surfaces 48 are formed with semi-spherical opposed cavities 50 defining a gas chamber 51 linking slot 28 to contoured surfaces 48. The system 10 provides a first air passage 52, extending through support member 32 and lower plate 14, to establish fluid flow communication with gas chamber 51. A second cover-gas passage 54 extends through clamp support member 32 and lower plate 14 to establish fluid flow communication with gas chamber 51. Pressurized air injected into air passage 52, exits chamber 51 by means of upper plate air exhaust passage 56, establishing a sheet of air flow passing between focusing head 26 and the edges of sheets 11, 11' to be welded. In this manner, splattered sheet weld material is unable to pass through the shielding air flow, thereby preventing the splattered material from accumulating on cover glass 46. Cover gas passage 54 may be used to inject a cover or shielding gas, such as helium, into gas chamber 51 to assist the laser welding process, as is well known in the art.

Again referring to FIG. 1, system 10 further includes a computer 70 for controlling actuators 30, focusing head 26 and clamp support 32 to thereby control the respective motions of each. For example, computer 70 may remotely operate power arm actuators 30 to thereby control movement of upper plate 16 between its opened and closed positions. Further, computer 70 may control movement of lens 44 for remotely focusing the laser beam on the material 11, 11' to be welded. Also, computer 70 may control the axial motion of clamp support 32, in addition to switching and/or sharing the laser beam.

According to the present invention, laser beam source 22 may comprises a time-share distributor 72 of a known design, as disclosed in the October, 1989 issue of "Photonics Spectra" magazine in an article entitled "Designer's Handbook, The Modern Industrial YAG Laser." In FIG. 1 distributor 72 is shown incorporating a multi-positional switch 74 adapted to route a laser beam, received from a single laser beam generator, to any one of fiber optic cables 18 in a sequential manner in response to an electrical signal input from computer 70. Distributor 72 may also be used to couple a laser beam generator to multiple clamps 12 in a simultaneous fashion, wherein two or more weld joints may be produced at the same time. The preferred laser beam source or generator is a Nd:YAG laser, although other comparable laser generators may be used.

Figure 5:
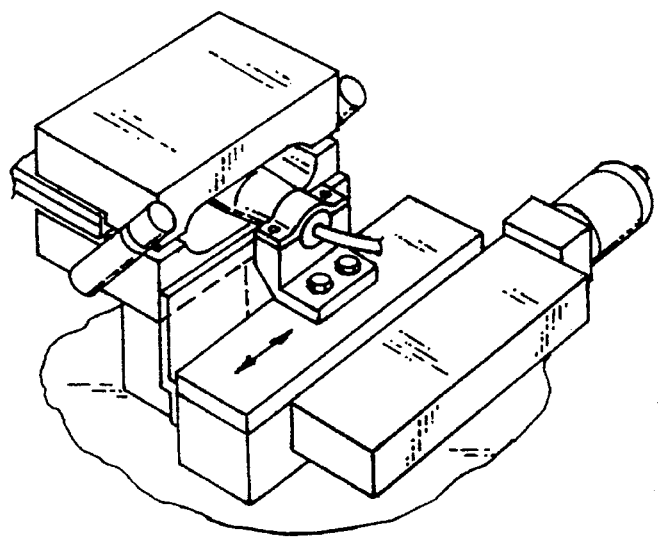
FIG. 5 is a fragmentary perspective view of a linear stitch welding clamp for use in the welding system shown in FIG. 1.

Referring now to FIG. 5, numeral 110 generally indicates another embodiment of a laser welding system according to the invention. Because some of the details of laser welding system 110 have similar components or parts, as in laser welding system 10 shown in FIGS. 1–4, similarly ending numerals are used for like or similar parts. Additionally, laser welding system 110 includes all the components, whether shown or not shown, of laser welding system 10 except for the differences set forth below.

Whereas focusing head 26 of FIGS. 1–4 is fixedly secured to clamp 12, focusing head 126, as shown in FIG. 5, is movably secured to clamp 112. Slot 128 defines a path of motion. Focusing head 126 is adapted to travel the path of motion moving the laser beam across material 111 thereby forming a linear stitch weld joint, as opposed to a spot weld joint. Welding system 110 further includes a drive assembly 158 operably associated with focusing head 126, for moving focusing head 126 along the path of motion. Focusing head 126 is mounted to a reciprocal table 160 by a bracket 162. Table 160 is movable in a linear horizontal path along an "X" axis 168 relative to a base 164 which is fixedly secured to lower plate 114. Drive assembly 158 includes a motor and gear assembly 166, secured to base 164 for moving table 160 along "X" axis 168 thereby moving focusing head 126 along the path of motion. Drive assembly 158, which may be of a known design as manufactured by Parker and sold under the name "Daedal Positioning Systems and Controls," is adapted to be remotely controlled by computer 170.

Figure 7:
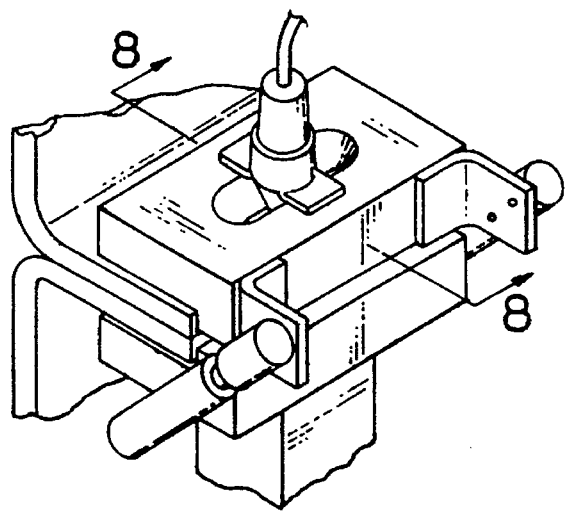
FIG. 7 is a fragmentary perspective view of a clamp used in the laserwelding system shown in FIG. 6.
Figure 8:
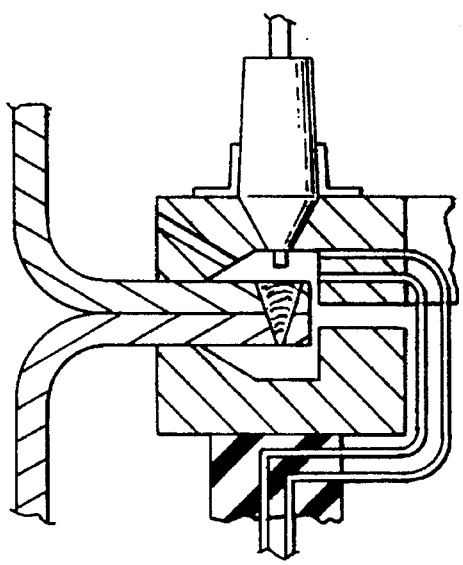
FIG. 8 is a fragmentary cross-sectional view taken on the line 8—8 of FIG. 7.
Figure 6:
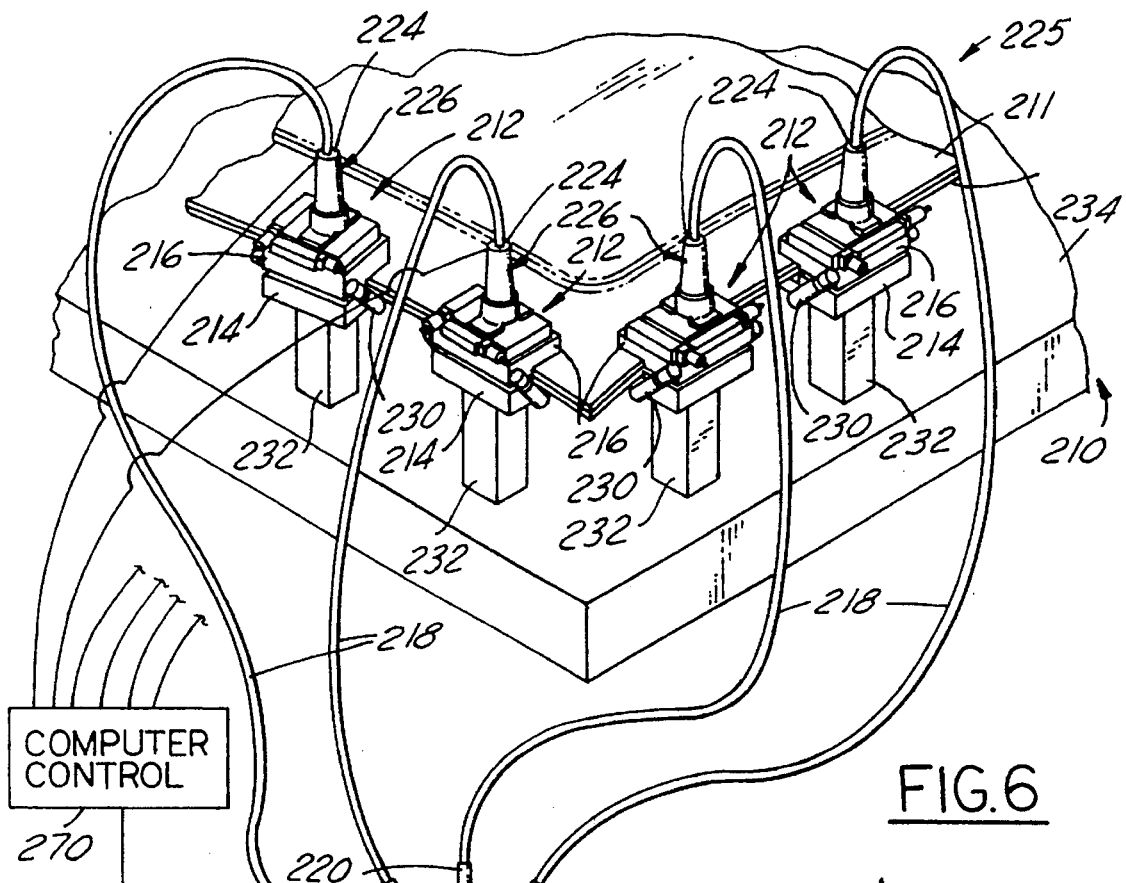
FIG. 6 is a fragmentary perspective view of a laser lap welding system according to the invention.

Referring now to FIGS. 6–8, another embodiment of a laser welding system according to the present invention is shown and is generally indicated by numeral 210. Because some of the details of system 210 are similar to those of systems 10, 110, shown in FIGS. 1–5 and described above, similarly ending numerals are used for like or similar parts. Whereas clamp slots 28 and 128 are positioned between their associated lower and upper clamp plates, slot 228 is formed in upper plate 216 to thereby allow the opposed face-to-face flush surfaces of the sheets 211, 211' to be laser welded together. Focusing head 226 is fixedly mounted to clamp 212, partially within slot 228, as shown best in FIGS. 7–8. Air passage 252 and cover or shielding gas passage 254 extend through upper plate 216, as opposed to lower plate 214, as in FIGS. 1–5. Also, air passage 252 and cover gas passage 254 include tubes 253, 255 extending from upper plate 216 and support member 232, respectively. Actuators 230 are mounted to upper plate 216 via a pair of L-shaped brackets 231.

Figure 9:
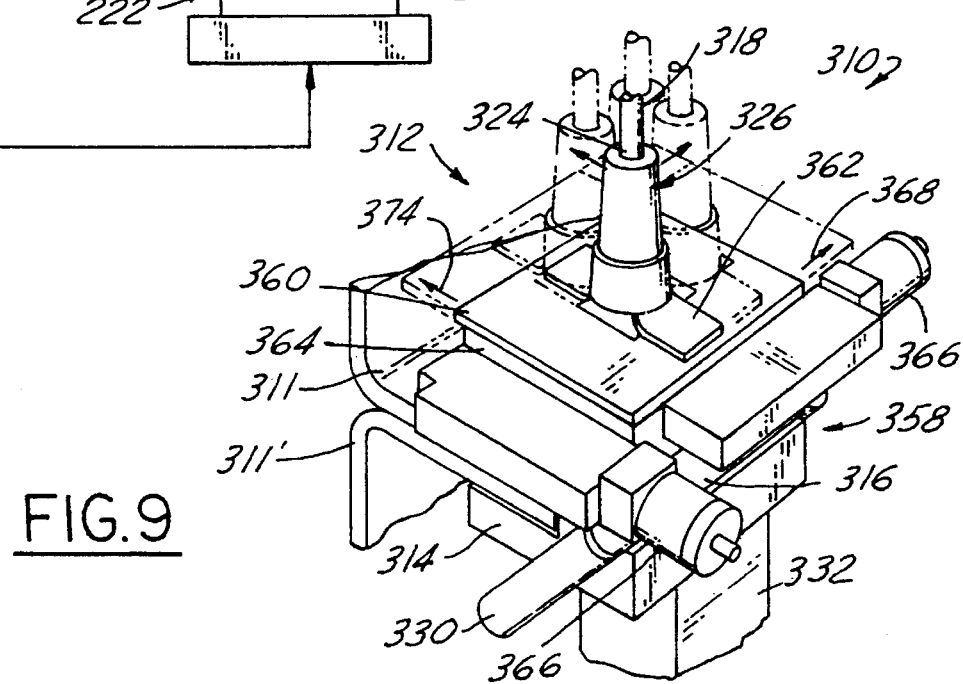
FIG. 9 is a fragmentary perspective view of a two-dimensional lap welding clamp for use in the welding system shown in FIG. 6.

Referring now to FIG. 9, another embodiment of a laser welding system, according to the present invention, is shown and generally indicated by numeral 310. Because some of the details of laser welding system 310 have similar components or parts, as in laser welding system 210 shown in FIGS. 6–8, similarly ending numerals are used for like or similar parts. Additionally, laser welding system 310 includes all the components, whether shown or omitted, of the laser welding system 210, except for the differences set forth below.

Whereas focusing head 226 of FIGS. 6–8 is fixedly secured to clamp 212, the FIG. 9 focusing head 326 is movably secured to clamp 312. A slot 328 defines a path of motion. Focusing head 326 may be moved along the path of motion thereby moving the laser beam across sheet material 311 to form a linear stitch weld joint or two-dimensional lap weld joint as opposed to a spot weld joint. Welding system 310 further includes a drive assembly 358, operably associated with focusing head 326, for moving focusing head 326 along the path of motion. Focusing head 326 is mounted to a table 360 by a bracket 362. Table 360 is movable in a linear horizontal path along an "X" axis 368 and a "Y" axis 374 relative to a base 364 which is fixedly secured to upper plate 316. Drive assembly 358 thereby moves the focusing head 326 along "X" axis 368 and "Y" axis 374. It will be noted that drive assembly 358 includes two motor and gear assemblies 366 secured to base 364 for moving table 360 along the horizontal path of "X" axis 368 and "Y" axis 374 to thereby move focusing head 326 along the path of motion. Drive assembly 358 is of a known design, as manufactured by Parker, and sold under the name "Daedal Positioning Systems and Controls." As in the above described embodiments, drive assembly 358 may be remotely controlled by a computer 370.

Although not shown, clamps 12, 112, 212, 312 may be used together in any combination for laser welding material 11, 111, 211, 311 to thereby provide multiple types of weld joints, such as spot weld joints, linear stitch weld joints, two-dimensional lap weld joints, or the like.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A laser welding system for welding sheets of material together, said system comprising:

at least one clamp having a lower plate and an upper plate moveable relative to said lower plate for squeezing together associated sheets of material positioned therebetween;

a fiber optic cable for each said clamp, said cable having a first end adapted to be coupled to a laser beam source and a second end coupled to said clamp for transmitting a laser beam from the laser beam source to said clamp; and a focusing head secured to said clamp for coupling said cable second end to said clamp and for focusing said laser beam onto the material to be welded;

wherein each said clamp includes a slot extending through said clamp and said slot is positioned horizontally between said upper and lower plates, to thereby allow vertically disposed edge portions of associated upper and lower clamped sheets to be laser welded together.

2. The laser welding system as in claim 1 wherein said slot defines a path of motion.

3. The laser welding system as in claim 2 wherein said focusing head is moveable relative to said clamp along said path of motion for moving said laser beam across the material.

4. The laser welding system as in claim 3 wherein said focusing head extends into said slot.

5. The laser welding system as in claim 3 further including a drive assembly operatively associated with said focusing head for moving said focusing head along said path of motion.

6. The laser welding system as in claim 5 further including a computer controller operatively linked to said drive assembly for controlling said drive assembly to control the movement of said focusing head.

7. The laser welding system as in claim 5 wherein said drive assembly moves said focusing head along an X axis.

8. The laser welding system as in claim 5 wherein said drive assembly moves said focusing head along an X axis and a Y axis.

9. The laser welding system as in claim 1 further including a clamp support member extending downwardly from said lower plate of each said clamp for elevating each said clamp above a work surface.

10. The laser welding system as in claim 9 wherein said clamp support member is constructed of a resilient material.

11. The laser welding system as in claim 9 wherein said clamp support member is removably securable to said work surface.

12. The laser welding system as in claim 11 wherein said work surface includes a plurality of apertures for engagement with said clamp support member to thereby removably secure said clamp support member to said work surface.

13. The laser welding system as in claim 1 further including a computer-controlled clamp actuator for moving said upper plate relative to said lower plate between a first closed position and a second opened position.

14. A laser welding system for welding sheets of material together, said system comprising:
   a laser beam source for generating and supplying a laser beam;
   at least one clamp having a lower plate and an upper pilate moveable relative to said lower plate for squeezing together associated upper and lower sheets positioned therebetween;
   a fiber optic cable for each said clamp, said cable having a first end coupled to said laser beam source and a second end coupled to said clamp for transmitting a laser beam from said laser beam source to said clamp; and
   a focusing head secured to said clamp for coupling said second end of said cable to said clamp and for focusing said laser beam onto juxtaposed portions of the sheets to be welded;
   wherein each said clamp includes a slot extending through said clamp and said slot is horizontally positioned between said upper and lower plates to thereby allow vertically disposed co-planar edge portions of the sheets to be laser welded together.

15. The laser welding system as in claim 14 further including a laser beam delivery instrument operatively coupled to said laser beam source and each said cable for distributing said laser beam to each said cable by selectively passing said laser beam through said first end.

16. The laser welding system as in claim 15 wherein said laser beam delivery instrument distributes said laser beam to each said clamp sequentially.

17. The laser welding system as in claim 15 further including a computer controller for controlling said delivery instrument to control the distribution of said laser beam between each said clamp.

18. The laser welding system as in claim 14 wherein said slot defines a path of motion.

19. The laser welding system as in claim 14 wherein said focusing head extends into said slot.

20. The laser welding system as in claim 14 further including a drive assembly operatively associated with said focusing head for moving said focusing head along said path of motion.

21. The laser welding system as in claim 20 including a computer controller operatively linked to said drive assembly for controlling said drive assembly to control the movement of said focusing head.

22. The laser welding system as in claim 20 wherein said drive assembly moves said focusing head along an X axis.

23. The laser welding system as in claim 20 wherein said drive assembly moves said focusing head along an X axis and a Y axis.

24. The laser welding system as in claim 14 further including a clamp support member extending downwardly from said lower plate of each said clamp for elevating each said clamp above a work surface.

25. The laser welding system as in claim 24 wherein said clamp support member is removably securable to said work surface.

26. The laser welding system as in claim 25 wherein said work surface includes a plurality of apertures for engagement with said clamp support member to thereby removably secure said clamp support member to said work surface.

27. The laser welding system as in claim 24 wherein said clamp support member is constructed of a resilient material.

28. The laser welding system as in claim 24 wherein said clamp support member is movable relative to said work surface so as to vary the vertical distance between each said clamp and said work surface.

29. The laser welding system as in claim 24 wherein said clamp support member is movable so as to vary the horizontal position of said clamp support member relative to said work surface.

30. The laser welding system as in claim 14 further including a computer-controlled clamp actuator for moving said upper plate relative to said lower plate between a first closed position and a second opened position.

* * * * *